(12) United States Patent
Wakefield et al.

(10) Patent No.: US 7,586,292 B1
(45) Date of Patent: Sep. 8, 2009

(54) LOW VOLTAGE CUTOFF CIRCUIT FOR AN ELECTROCHEMICAL CELL

(75) Inventors: Wesley Wakefield, Lockport, NY (US); Roy Mast, East Amherst, NY (US); Troy Dayton, Syracuse, UT (US); James Stawitzky, North Tonawanda, NY (US)

(73) Assignee: Electrochem Solutions, Inc., Clarence, NY (US)

( * ) Notice: Subject to any disclaimer, the term of this patent is extended or adjusted under 35 U.S.C. 154(b) by 389 days.

(21) Appl. No.: 11/279,274

(22) Filed: Apr. 11, 2006

Related U.S. Application Data (60) Provisional application No. 60/679,049, filed on May 9, 2005.

(51) Int. Cl.
H02J 7/00 (2006.01)
H02H 3/24 (2006.01)

(52) U.S. Cl. .......................... 320/136; 361/92

(58) Field of Classification Search ................. 320/106, 320/112, 116, 117, 118, 121, 122, 132, 134, 320/136; 429/12, 90, 91, 92, 93, 99; 307/64, 307/66, 71, 103, 125; 340/309.5; 361/92, 361/93.4, 94, 189
See application file for complete search history.

(56) References Cited

U.S. PATENT DOCUMENTS

| | | | |
|---|---|---|---|
| 4,622,508 A | 11/1986 | Matteau et al. | |
| 4,634,936 A * | 1/1987 | Gentry et al. | 315/307 |
| 4,704,542 A | 11/1987 | Hwang | |
| 4,785,229 A | 11/1988 | Edwards | |
| 5,179,337 A | 1/1993 | Staarman et al. | |
| 5,225,461 A * | 7/1993 | Kamikado et al. | 523/415 |
| 5,296,997 A * | 3/1994 | Betton et al. | 361/92 |
| 5,357,395 A * | 10/1994 | Bissell et al. | 361/92 |
| 5,365,453 A | 11/1994 | Startup et al. | |
| 5,668,465 A | 9/1997 | May | |
| 5,695,886 A | 12/1997 | Dewan et al. | |
| 5,896,025 A | 4/1999 | Yamaguchi et al. | |
| 5,898,291 A | 4/1999 | Hall | |
| 6,074,776 A | 6/2000 | Mao et al. | |
| 6,118,248 A | 9/2000 | Gartstein et al. | |
| 6,163,131 A | 12/2000 | Gartstein et al. | |
| 6,249,106 B1 * | 6/2001 | Turner et al. | 320/136 |
| 6,489,749 B1 | 12/2002 | Nakashimo et al. | |
| 6,891,353 B2 | 5/2005 | Tsukamoto et al. | |
| 2003/0141764 A1 * | 7/2003 | Brown et al. | 307/103 |
| 2005/0136296 A1 | 6/2005 | Skidmore et al. | |

* cited by examiner

*Primary Examiner*—Akm E Ullah
*Assistant Examiner*—M'Baye Diao
(74) *Attorney, Agent, or Firm*—Michael F. Scalise (57) ABSTRACT

The present invention is an electrical circuit that disconnects an electrochemical cell from a load when the cell's voltage descends to a predetermined value. The present invention is also applicable to a battery configuration and its corresponding electrochemical cells. The predetermined value is designed to decrease the chance that the cell or battery will become unstable while connected to the load.

19 Claims, 7 Drawing Sheets

LOW VOLTAGE CUTOFF CIRCUIT FOR AN ELECTROCHEMICAL CELL

CLAIM OF PRIORITY

This application claims priority to U.S. provisional patent application Ser. No. 60/679,049, filed on May 9, 2005.

BACKGROUND OF THE PRESENT INVENTION

Primary lithium cells comprise a lithium anode, a cathode, a separator between the anode and the cathode, and an electrolyte within a hermetically sealed casing. The term lithium includes cells using lithium, a lithium alloy or other lithium-containing materials. Examples of typical primary lithium based cells can be obtained from Greatbatch, Inc. in Clarence, N.Y., including their Electrochem Commercial Power division.

For this application, a plurality of cells is referred to as a battery. These cells and batteries are used in applications where high energy density are required and where frequent cell replacement is undesirable.

A primary lithium cell becomes unstable when the cell is run down beyond its useful life. It is understood to those of ordinary skill in the art that the useful life of a primary lithium cell, for example of a moderate rate size D unit, is complete when it is depleted below 1.5 volts as measured over an open circuit.

When the cell becomes unstable, the primary lithium cell can swell beyond the casing's burst pressure. If such swelling occurs, the electrolyte can leak from the casing. The leak can be slow, rapid or anywhere in-between. What ever the leak rate, electrolyte leaks are undesirable and can damage that which is being powered by the cell.

It is desirable to decrease the chance of a primary lithium cell becoming unstable when it is connected to a load. The present invention addresses at least that problem.

SUMMARY OF THE INVENTION

The present invention is an electrical circuit that disconnects an electrochemical cell from a load when the cell's voltage descends to a predetermined value. The present invention is also applicable to a battery configuration and its corresponding electrochemical cells. That predetermined value is designed to decrease the chance of the electrochemical cell or battery becoming unstable while connected to its load.

DETAILED DESCRIPTION OF THE INVENTION

Figure 1:
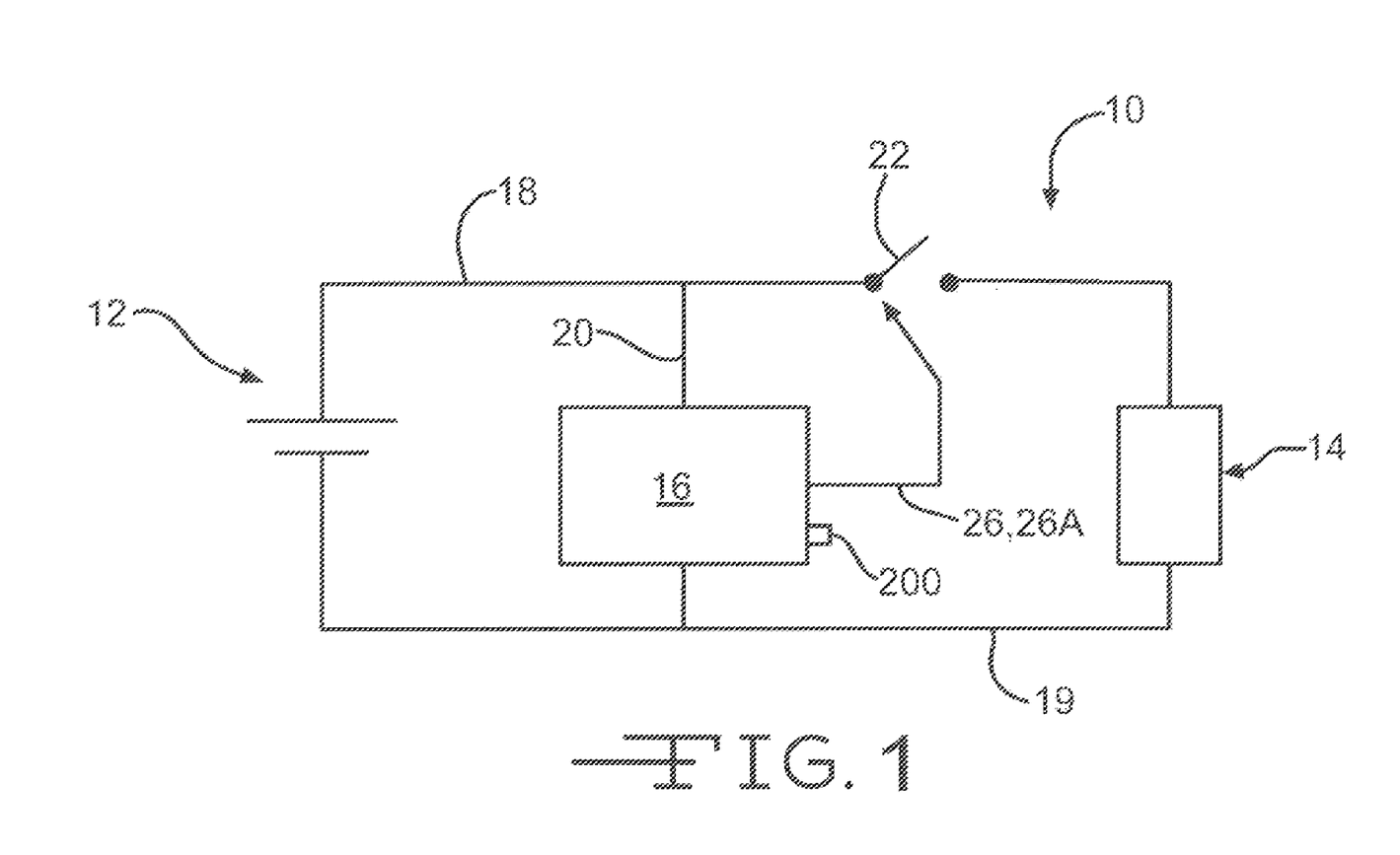
FIG. 1 illustrates an electrical schematic of the present invention.

FIG. 1 illustrates an electrical schematic of a low voltage cutoff circuit 10 for a single electrochemical cell 12 according to the present invention.

The electrochemical cell 12 can be a primary or a secondary cell. However, in a preferred embodiment, the electrochemical cell 12 is of a primary chemistry. The cell chemistry can be, for example, a magnesium electrochemical cell, a zinc manganese electrochemical cell, a nickel-metal hydride electrochemical cell, or a lithium electrochemical cell. Preferably, the cell is of a lithium chemistry.

The electrochemical cell 12 transmits an electrical current across line 18. The line 18 directs the electrical current to a load 14. Prior to reaching the load 14, the line 18 has a switch 22 that controls whether the electrical current reaches the load 14 or not.

Figure 2:
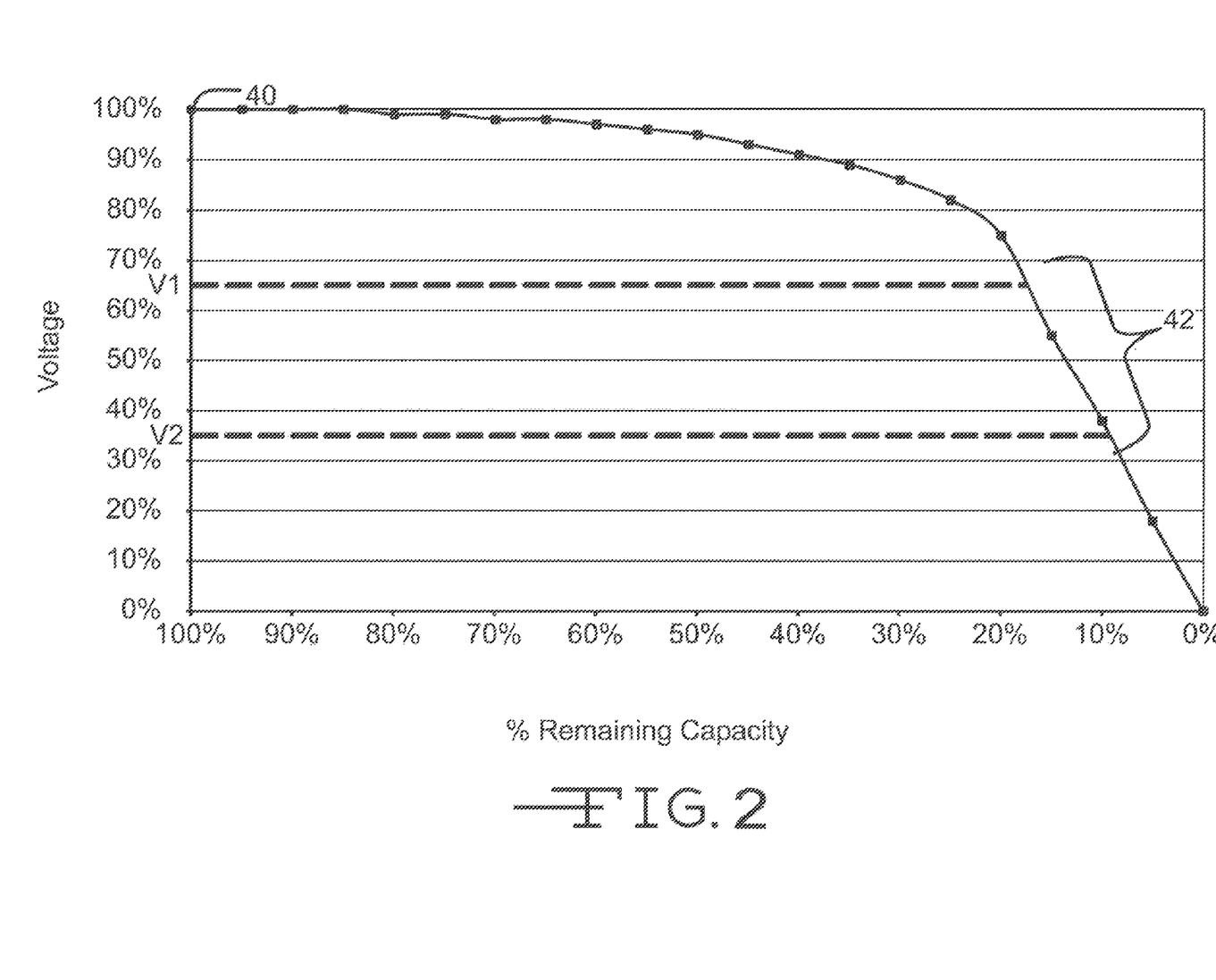
FIG. 2 illustrates a graph of a primary lithium cell's voltage over the percentage of remaining capacity (and time).

As the electrochemical cell 12 discharges under a constant or near constant current or power load, the cell's voltage drops from the initial voltage 40 of a fully charged cell under load. As illustrated in FIG. 2, the voltage drop can be abrupt and occur as a precipitous drop 42 at near full depletion of the cell's voltage. Therefore, it is sometimes difficult to determine when the electrochemical cell 12 is about to become unstable.

There is a relationship between the remaining capacity of the cell 12 and its open circuit voltage. As the cell's voltage under a light load drops from $V_1$ to $V_2$ as shown in FIG. 2, the cell's capacity is reduced. At some reduced voltage, the cell providing the current to the load 14 should be shut off. When the current is shut off, the cell 12 should be removed from the circuit 10. The cell's removal decreases, and prevents, further depletion of the cell's electrical current.

Excessive depletion of the cell electrical current may cause the cell 12, in particular a primary lithium cell, to swell, rupture, and leak electrolyte. Such results are undesirable since the electrolyte is normally deleterious to surrounding objects. To decrease the chance of such deleterious results, the low voltage cutoff circuit 10 monitors the cell's electrical current and controls the switch 22 that allows the load 14 to receive the cell current.

While the cell current is going across line 18, a portion of the current is diverted across line 20 toward a sensing circuit 16. The sensing circuit 16 measures the voltage of the cell current. If the cell's voltage is greater than a predetermined value, the sensing circuit 16 transmits a close signal 26 to close the switch 22. That way, the switch 22 controls connection of the cell's electrical current to the load 14.

If the current's voltage is less than the predetermined value, the sensing circuit 16 transmits an open signal 26a to open the switch 22. If that occurs, switch 22 disconnects the cell from the load 14.

The predetermined voltage can be any value determined by an operator of the low voltage cutoff circuit 10 or the manufacturer thereof. In many instances, the predetermined value is set at a voltage (a) just prior to when the cell 12 normally becomes unstable, (b) when the cell initiates a significant drop in voltage output or capacity, or (c) between when the cell initiates a significant drop in voltage output or capacity and prior to the cell becoming unstable.

If the cell is a moderate rate size D primary lithium cell, the predetermined voltage could be about 2.0 volts. The value of 2.0 volts is selected for moderate rate size D primary lithium electrochemical cells because they are on a path to instability when their voltage is below 2.0 volts. The path to instability is illustrated in FIG. 3.

Figure 3:
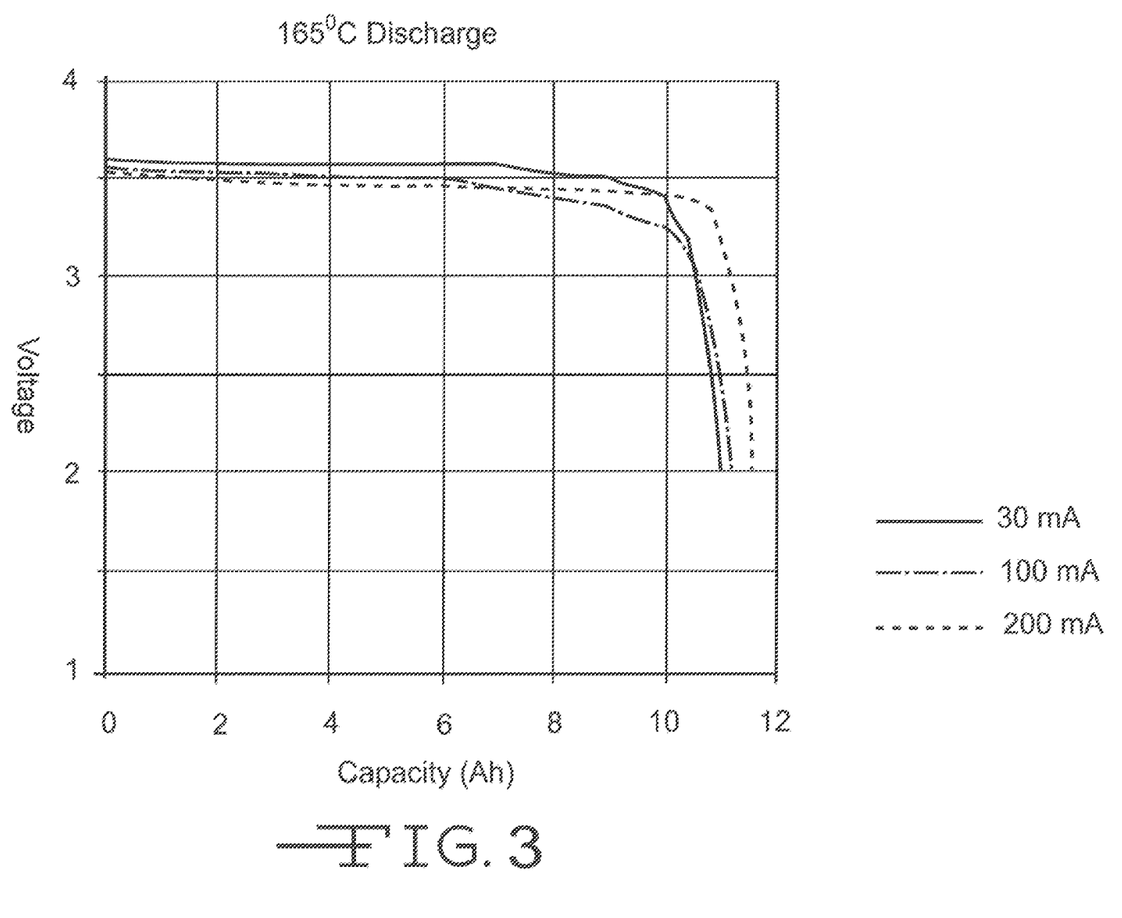
FIG. 3 illustrates a graph of a primary lithium cell's voltage over time when connected to a load.

FIG. 3 illustrates three different electrical currents generated from moderate rate size D primary lithium electrochemical cells manufactured by Electrochem Commercial Power in relation to voltage over time. From the graph, it seems appropriate to prevent the cell 12 from further discharging when its voltage drops below 2.0 volts or approximately 11 Ah of power. Below 2.0 volts or beyond 11 Ah of power, the moderate rate size D primary lithium cell 12 rapidly decreases in voltage. As previously stated, a primary lithium electrochemical cell becomes unstable when it is run down beyond its useful life. To decrease the chance of the cell discharging beyond its useful life, the cell is disconnected at the predetermined value—in this example, 2.0 volts. Obviously, each cell 12 can have its own predetermined value that is determined by the user or the manufacturer thereof.

The predetermined voltage value is set in the sensing circuit 16. The cell predetermined voltage value can be incorporated into a single electrical device or a combination of electrical devices. The devices can include, but not be limited to, fuses, resistors, transistors, field effect transistors, and voltmeters.

Figure 4:
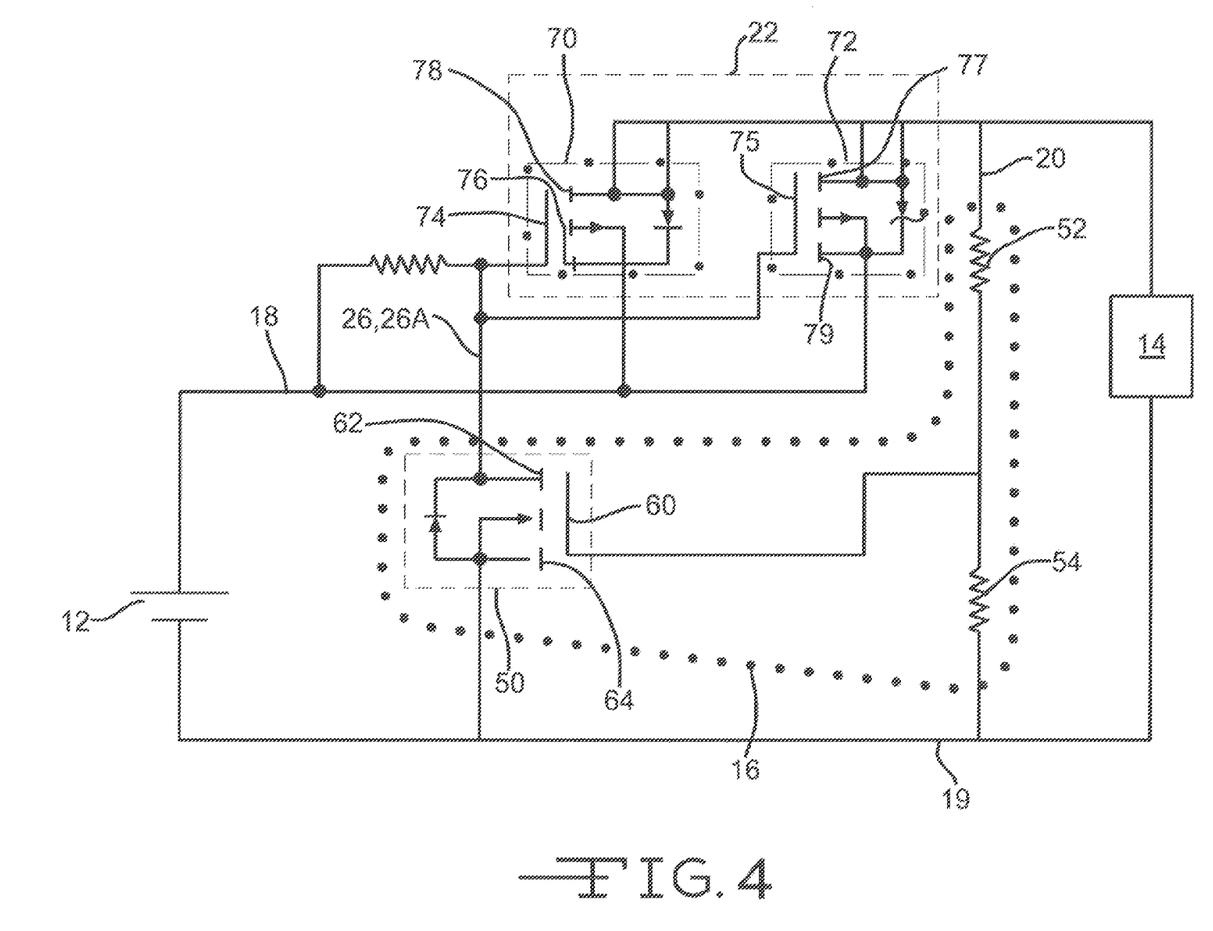
FIG. 4 is a specific embodiment of FIG. 1.

FIG. 4 illustrates a specific embodiment of FIG. 1, and in particular the sensing circuit 16. The sensing circuit 16 includes a transistor 50 with sense resistors 52, 54. The transistor 50 can be a field effect transistor having a gate 60, a drain 62 and a source 64. In the embodiment illustrated, the transistor 50 is an N-channel enhanced node MOSFET.

The switch 22 is transistor 70. The transistor 70 is a field effect transistor having a gate 74, a source 76, and a drain 78. In the illustrated embodiment, the transistor 70 is a P-channel node MOSFET. The gate 74 is biased from the signal 26, 26a from drain 62 of transistor 50.

When the voltage dividers of resistors 52, 54 drop the gate 60 below its switching potential, the gate 74 switches off the cell electrical current flow to the load 14. Thus, a low gate-source voltage to transistor 70 results in low (off) drain which opens the switch 22.

Once the switch 22 is opened, the electrochemical cell 12 disconnects from the load. After disconnection, the cell 12 partially recovers its output voltage. This recovery can be significant in primary electrochemical cells 12. The recovered output voltage, however, generates insufficient capacity to the load 14. Therefore, the cell 12 is kept in the disconnected state to prevent power cycling.

The cell 12 remains in the disconnected state until a manually operated reset switch 200 or an electronic signal, remotely or manually, is transmitted to override the disconnected state.

Alternative Embodiments

In FIG. 4, the transistor 72 is illustrated as a secondary component of switch 22. Transistors 72 and 70 can be the same or different. If the transistors 70, 72 are the same, they can be dual packaged units, and in particular P-channel node MOSFETs. Transistor 72 operates in the same way as transistor 70 and has a gate 75, a source 77, and a drain 79. Transistor 72 can be a redundant switch 22 to ensure that the low voltage cutoff circuit 10 remains disconnected or connected in certain embodiments.

The sensing circuit 16 can also incorporate a second field effect transistor. The second field effect transistor can be in a series configuration, a parallel configuration, or combinations thereof with the first transistor 50. The second field effect transistor increases the predetermined voltage value in the sensing circuit 16. That increase may be necessary when the predetermined voltage value exceeds the voltage ability of the first field effect transistor.

Multiple Cell or Battery Embodiments

A first electrochemical cell 12a and a second cell 12b can be connected in series (FIG. 5), parallel (FIG. 6) or various combinations thereof in order to achieve greater current or voltage potential. Any combination of the first cell 12a and the second cell 12b forms a battery 120.

Figure 5:
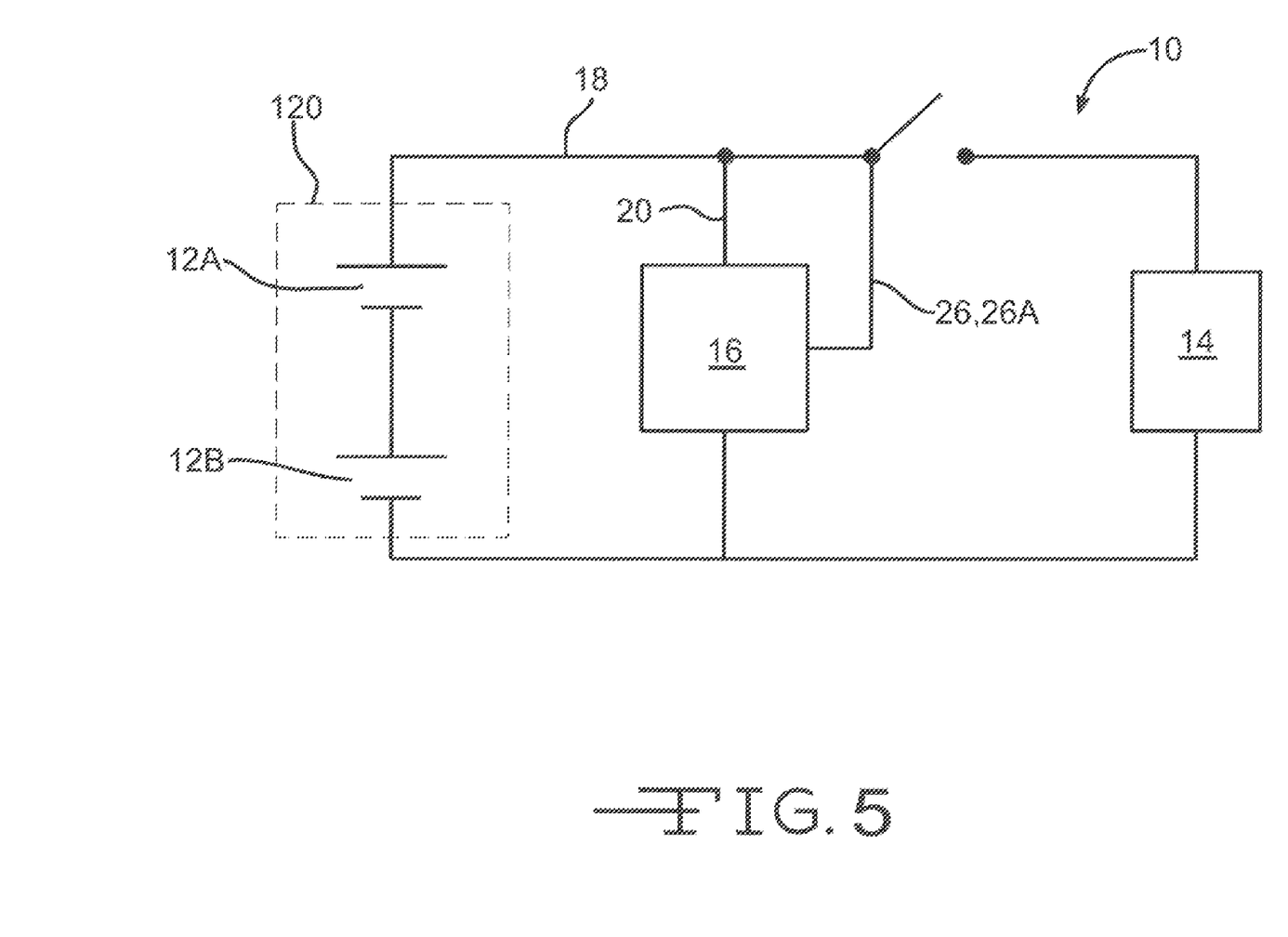
FIG. 5 is an alternative embodiment of FIG. 1 with a battery comprising primary electrochemical cells in a series configuration.
Figure 6:
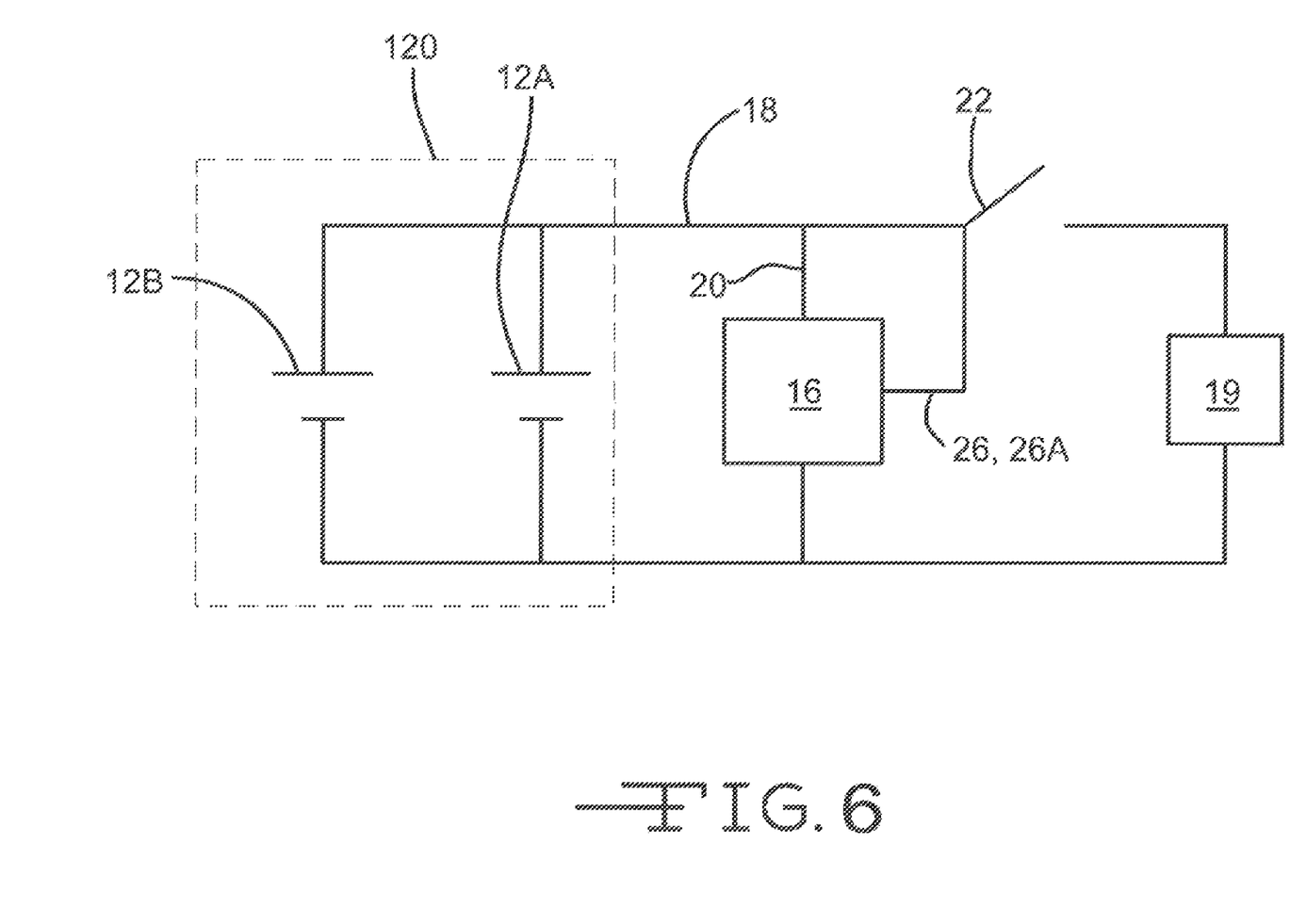
FIG. 6 is an alternative embodiment of FIG. 1 with a battery comprising primary electrochemical cells in a parallel configuration.
Figure 7:
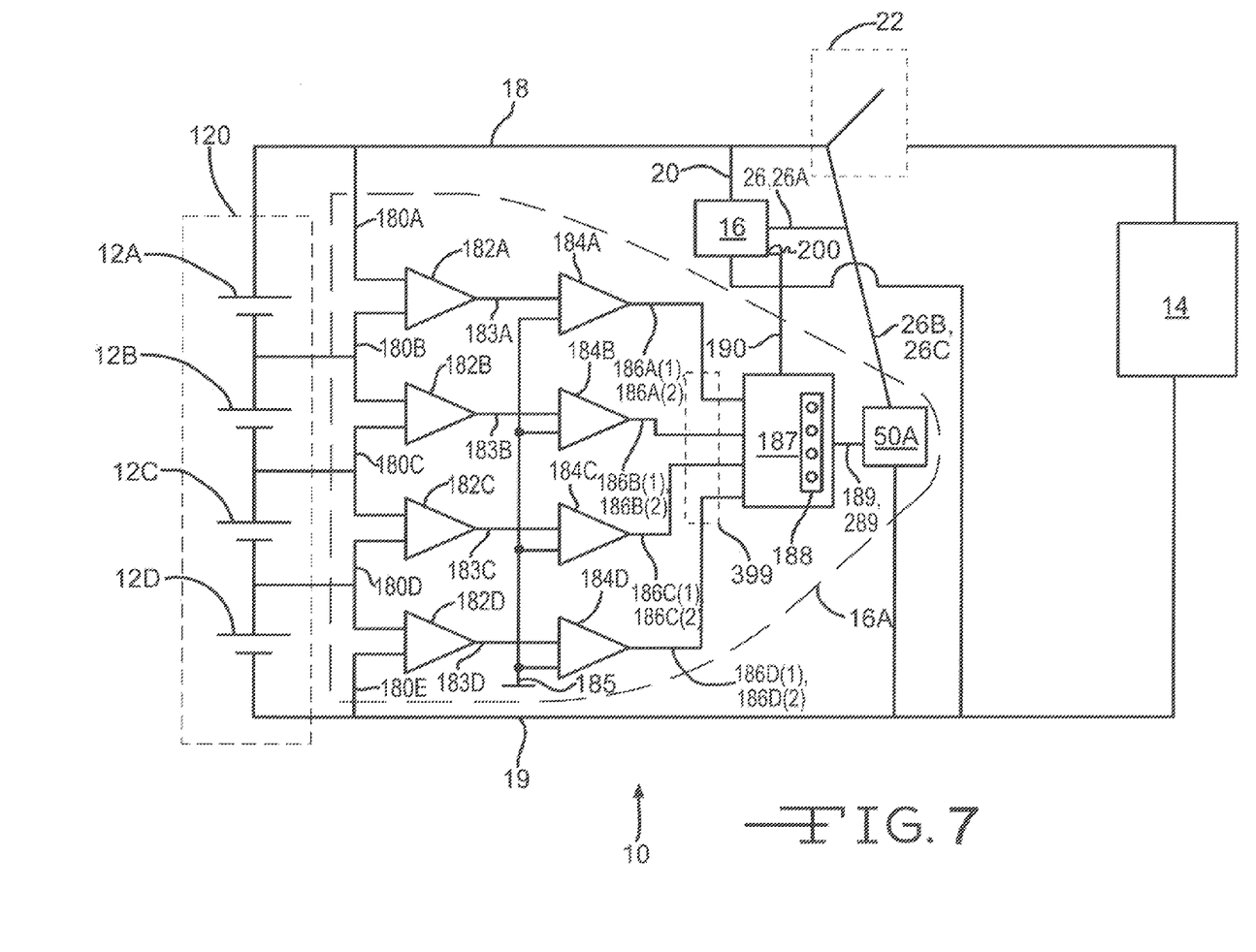
FIG. 7 is an alternative embodiment of FIGS. 5 and 6.

The battery 120 transmits an electrical current across line 18, as illustrated in FIGS. 5 to 7. The line 18 directs the electrical current to the load 14. Prior to reaching the load 14, however, the line 18 has a switch 22 that controls whether the electrical current reaches the load 14, or not.

While the electrical current is going across line 18, a portion of the current is diverted across line 20 toward the sensing circuit 16, which measures the voltage of the battery electrical current. If the voltage is greater than a predetermined value, the sensing circuit 16 transmits the close signal 26 to close the switch 22. That way, switch 22 maintains the connection of the battery's electrical current to the load 14. If the voltage of the battery electrical current is less than the predetermined value, the sensing circuit 16 transmits the open signal 26a to open the switch 22. If that occurs, switch 22 disconnects the current from the load 14.

The predetermined voltage can be any value that is determined by an operator of the low voltage cutoff circuit 10 or the manufacturer thereof. In any event, the predetermined voltage is set at a voltage (a) just prior to when the battery 120 becomes unstable, (b) when the battery 120 initiates a significant drop in voltage output or capacity, or (c) between when the battery 120 initiates a significant drop in voltage output or capacity and just prior to when the battery 120 becomes unstable.

As illustrated in FIG. 6, the battery 120 can have the first cell 12a and the second cell 12b in a parallel configuration. The sensing device 16 illustrated in FIG. 4 may be used in the embodiment illustrated in FIG. 6. If so, it is possible that the battery electrical current may exceed the maximum battery predetermined value of the single field effect transistor 50. To solve that problem, a second field effect transistor (or even more) can be added in a parallel (or series) configuration with the field effect transistor 50 in the sensing circuit 16 to obtain the desired battery predetermined minimum threshold voltage value.

If multiple cells 12 are in a series configuration as illustrated in FIG. 5, an appropriate battery predetermined value can be established within the sensing circuit 16 with various devices to measure the battery electrical current. Likewise, the sensing circuit 16 can be the same as the sensing circuit 16 illustrated in FIG. 4, or have additional components in series configuration or parallel configuration to obtain the desired battery predetermined minimum threshold voltage value.

As illustrated in FIGS. 1 and 4 to 7 and described above, the low voltage cutoff circuitry 10 for the battery 120 can be the same or similar to the low voltage cutoff circuitry 10 for the single electrochemical cell 12. A problem, however, may arise when the first cell 12A is at a lower state of charge than the second cell 12B (or vice versa). If this occurs, the second cell 12b at the higher voltage could keep the overall voltage of the battery electrical current at a level above the battery disconnect threshold voltage or battery predetermined value. This means that the first cell 12a could become unstable and cause deleterious effects.

To address this potential problem, the voltage from each cell 12A, 12B within the battery 120 is measured. An example of how the voltage in individual cells of a battery is measured or monitored is illustrated in FIG. 7. There, the battery 120 comprises the first cell 12A, the second cell 12B, a third cell 12C, and a fourth cell 12D. Collectively the cells 12A to 12D form the battery 120.

Battery 120 transmits its electrical current across line 18 to the load 14. Prior to reaching the load 14, however, the switch 22 controls whether the electrical current reaches the load 14, or not.

Before and after the current passes through each electrochemical cell 12A to 12D, the current is transmitted across a respective amplifier line 180A to 180E. The amplifier lines 180A to 180E carry the following currents:

1. The current in amplifier line 180E is referred to as a return current because it flows across return line 19 from the load 14, the sensing circuit 16 and a second sensing circuit 16A (which will be described in greater detail starting in the next paragraph).
2. The current in amplifier line 180D is from the fourth cell and includes the return current plus the current provided by the fourth electrochemical cell 12D.
3. The current in amplifier line 180C is from the third cell and includes the fourth cell current plus the current provided by the third electrochemical cell 12C.
4. The current in amplifier line 180B is from the second cell and includes the third cell current plus the current provided by the second electrochemical cell 12B.
5. The current in amplifier line 180A is the battery electrical current.

Amplifier lines 180A to 180E direct their respective currents to a particular primary amplifier in the second sensing circuit 16A. The second sensing circuit 16A monitors the voltage from each cell 12A to 12D by measuring the voltage of the current before it enters a particular electrochemical cell and after the current exits the cell. Based on the illustration of FIG. 7, the primary amplifiers 182A to 182D operate as follows:

1. the fourth primary amplifier 182D compares the voltage of the fourth cell current (positive input) to the voltage of the return current (negative input);
2. the third primary amplifier 182C compares the voltage of the third cell current (positive input) to the voltage of the fourth cell current (negative input);
3. the second primary amplifier 182B compares the voltage of the second cell current (positive input) to the voltage of the third cell current (negative input); and
4. the first primary amplifier 182A compares the voltage of the battery electrical current (positive input) to the voltage of the second cell current (negative input).

The inputs described above can be collectively reversed. If the inputs they are, the comments set forth below in relation to the positive and negative results are reversed.

Each primary amplifier 182A to 182D generates a respective amplified result 183A to 183D, which is either a positive value, zero, or a negative value.

A zero value is obtained when there is no significant difference between the current that enters the positive input and that which enters the negative input of the primary amplifier.

A negative value is obtained when the current that enters the positive input has a voltage lower than the current that enters the negative input of the primary amplifier. The magnitude of the negative value is the differential between the voltages of the two currents.

If a negative value or a zero value is obtained, they indicate that the cell being measured is providing no voltage or alternatively, the amplifier lines in the particular primary amplifier were incorrectly positioned in the inputs. If the latter problem occurs, the user should re-position the inputs.

A positive value is obtained when the current entering the positive terminal has a voltage higher than the current entering the negative input of the primary amplifier. The magnitude of the positive value is the differential between the voltages of the two currents. Based on the example for the inputs into the primary amplifier and the object of the present invention, a positive value is the expected amplified result 183 from the primary amplifiers 182A to 182D.

Each primary amplifier 182A to 182D transmits their amplified result 183A to 183D to a corresponding secondary amplifier 184A to 184D. Each secondary amplifier 184 compares the amplified result 183 to a fixed reference voltage 185. The fixed reference voltage 185 is the cell predetermined voltage, or an equivalent thereof that adjusts the cell predetermined voltage in relation to the amplification or voltage differentiation provided by the primary amplifier 182A to 182D.

In response to the comparison of the amplified result 183 to the fixed reference voltage 185, each secondary amplifier 184A to 184D generates a status signal 186A to 186D(1 or 2). The status signal 186A to 186D(1 or 2) conveys whether a particular cell is presently stable or on a path to instability. The status signal 186A to 186D(1) indicates a path to instability and that signal is transmitted when the amplified result 183 is near, at or below the fixed reference voltage 185. The status signal 186A to 186D(2) that indicates a particular cell is presently stable occurs when the particular amplified result 183 is sufficiently above the fixed reference voltage 185. What is sufficiently above the fixed reference voltage is a value determined by the user, provider, or manufacturer of the low voltage cutoff circuitry 10.

A latch circuit 187 receives the status signals 186A to 186D(1,2). The latch circuit 187 transmits a change signal that identifies which cell 12A to 12D requires removal from the low voltage cutoff circuitry 10. The change signal can be transmitted visually (as illustrated in a LED signal box 188), audibly, or remotely to an alert unit that informs a controller or manufacturer to remove a particular primary cell 12A to 12E from the low voltage cutoff circuitry 10. The change signal, with its visual, audible or remote alarms, uses conventional circuitry that is known to those of ordinary skill in the art.

When the latch circuit 187 receives a path to instability status signal 186A to 186D(1) from any electrochemical cell 12, the latch circuit 187 transmits disconnect signal 190 to disconnect the reset button 200 and an open gate signal 189 to a field effect transistor 50A. Receipt of the open gate signal 189 results in the field effect transistor 50A transmitting an open signal 26B to open the switch 22. When the switch 22 is open, the battery current is prevented from reaching the load 14.

Alternatively, if the latch circuit 187 receives stable status signals 186A to 186D(2) from each electrochemical cell 12, the latch circuit 187 transmits a close signal 289 to the field effect transistor 50A. Receipt of the close signal 289 results in the field effect transistor 50A transmitting a close signal 26C to close the switch 22. When the switch 22 is closed, the battery current is applied to the load 14.

Alternative Embodiments

The sensing circuit 16A can have alternative components that accomplish the same objectives as illustrated and described above. The alternative components could include comparators, field effect transistors, transistors, fuses, switches and voltmeters.

Anywhere within the sensing circuit 16 or the second sensing circuit 16A, there can be a delay mechanism 399, as illustrated in FIG. 7. The delay mechanism 399 enables the second sensing circuit 16A to confirm the amplified result 183, and that the status signal 186A to 186D(1,2), the open gate signal 189 or the close signal 289 are accurate and not just an anomaly of noise, motion, a sudden spike in electrical current, or a sudden drop in electrical current. When the delay mechanism 399 receives any anomaly reading, the delay mechanism 399 delays the transmission of the respective signal 183, 186A to 186D(1,2), 189, or 289 until the delay mechanism 399 receives another anomaly reading within a predetermined time frame. The delay mechanism 399 can use a capacitor, logic circuits, analog/digital converters and combinations thereof to obtain the desired objectives of the delay mechanism 399. While the delay mechanism 399 is only illustrated in FIG. 7, it can also be incorporated into the sensing circuit 16 illustrated in FIGS. 1 and 4-6.

Applications

The load can be anything that requires a primary battery or a primary electrochemical cell having an anode, a cathode, a separator positioned between the anode and the cathode, and an electrolyte. In addition, the primary electrochemical cell is normally a lithium based cell. These types of batteries can be used in medical devices, satellites, the oil and gas industry to perform in extreme heat and pressure, survive pounding shock and vibration forces and often withstand corrosive environments; telematic services, military and aerospace applications such as flight data recorders, field communications devices, munitions, sensing devices, intelligence and surveillance, GPS systems, and un-manned aerial vehicles; seismic surveying; oceanography; and other industrial uses.

While preferred embodiments of the present invention have been disclosed, it will be appreciated that it is not limited thereto, but may be otherwise embodied with the scope of the following claims.

We claim:

1. A low voltage cutoff circuitry comprising:
    a) at least one primary electrochemical cell generating an electrical current powering a load;
    b) a first switch in a closed position between the load and the at least one primary electrochemical cell so that the primary cell powers the load;
    c) a sensing device that measures the at least one primary cell's voltage, transmits a close signal to the first switch in order to maintain the connection between the at least one primary cell and the load when the at least one cell's voltage is above a predetermined minimum threshold, and transmits an open signal to the first switch to disconnect the at least one primary cell from the load when the voltage is below the predetermined minimum threshold; and
    d) a manually operable reset switch that prevents re-connection of the at least one primary cell through the first switch to the load even if the at least one primary cell's open circuit voltage recovers to a value above the predetermined minimum threshold until the reset switch is manually reset.

2. The circuitry of claim 1 wherein the at least one primary cell is a lithium based electrochemical cell.

3. The circuitry of claim 1 wherein the at least one primary cell is of a moderate rate size D.

4. The circuitry of claim 3 wherein the predetermined minimum cell voltage threshold is about 2.0 volts.

5. The circuitry of claim 1 wherein the predetermined minimum threshold cell voltage is the voltage output when the at least one primary cell initiates a significant drop in voltage output or capacity.

6. The circuitry of claim 1 wherein the predetermined minimum threshold cell voltage is a voltage output between when the at least one primary cell initiates a significant drop in voltage output or capacity, but prior to the at least one primary cell becoming unstable.

7. The circuitry of claim 1 wherein the at least one primary electrochemical cell is selected from group consisting of a magnesium based electrochemical cell, a zinc manganese based electrochemical cell, a nickel-metal hydride based electrochemical cell, or a lithium based electrochemical cell.

8. The circuitry of claim 1 further comprising a delay mechanism to ensure that measurement of the at least one cell's voltage is accurate prior to transmitting the close signal or the open signal.

9. A low voltage cutoff circuitry comprising:
    a) a battery comprised of at least a first primary electrochemical cell and a second primary electrochemical cell;
    b) the first electrochemical cell generating an electrical current having a first cell voltage;
    c) the second primary electrochemical cell generating an electrical current having a second cell voltage;
    d) the first electrical current and the second electrical current forming a battery electrical current having a battery voltage powering a load;
    e) a first switch positioned between the load and the primary battery so that the battery powers the load;
    f) a first sensing device that measures the battery voltage and transmits a first close signal to the first switch to maintain connection between the primary battery and the load when the battery's voltage is above a predetermined minimum threshold voltage, and transmits an open signal to the first switch to disconnect the primary battery from the load when the battery's voltage falls below the predetermined minimum threshold; and
    g) a manually operable reset switch that prevents re-connection of the battery to the load even if the battery's voltage recovers to a value above the predetermined minimum threshold until the reset switch is manually reset.

10. The circuitry of claim 9 wherein the first primary cell and the second primary cell are either in a series or a parallel configuration.

11. The circuitry of claim 9 wherein the first and second cell voltages are independently measured.

12. The circuitry of claim 9 wherein the first and second primary cells are lithium based.

13. The circuitry of claim 9 wherein the first and second primary cells are of a moderate rate size D.

14. The circuitry of claim 9 wherein the fixed rate cell voltage is about 2.0 volts.

15. The circuitry of claim 9 wherein the fixed rate cell voltage is a voltage output between when at least one of the first and second cells initiates a significant drop in voltage output or capacity and prior to when the first or second cell becomes unstable.

16. The circuitry of claim 9 wherein the predetermined minimum threshold battery voltage is the voltage output when the primary battery initiates a significant drop in voltage output or capacity.

17. The circuitry of claim 9 wherein the predetermined minimum threshold battery voltage is a voltage output between when the primary battery initiates a significant drop in voltage output or capacity and prior to when the primary battery becomes unstable.

18. The circuitry of claim 10 wherein the first and second primary electrochemical cells are selected from the group consisting of a magnesium based electrochemical cell, a zinc manganese based electrochemical cell, a nickel-metal hydride based electrochemical cell, and a lithium based electrochemical cell.

19. The circuitry of claim 9 further comprising a delay mechanism to ensure that measurement of the battery voltage is accurate prior to transmitting the first close signal or the first open signal.

* * * * *